United States Patent [19]
Ayerst et al.

[11] Patent Number: 5,649,302
[45] Date of Patent: Jul. 15, 1997

[54] METHOD AND APPARATUS FOR IDENTIFYING AN INBOUND MESSAGE IN A RADIO COMMUNICATION SYSTEM

[75] Inventors: Douglas Irvin Ayerst, Delray Beach; Malik Khan, Lake Worth; Michael James Rudowicz, Delray Beach, all of Fla.

[73] Assignee: Motorola, Inc., Schaumburg, Ill.

[21] Appl. No.: 364,343

[22] Filed: Dec. 27, 1994

[51] Int. Cl.$^6$ .................................. H04B 7/26
[52] U.S. Cl. .................. 370/313; 455/38.2; 340/825.44
[58] Field of Search .................... 455/33.1, 38.1, 455/38.2, 54.1, 54.2, 53.1, 32.1, 38.4, 88; 340/825.44, 311.1

[56] References Cited

U.S. PATENT DOCUMENTS

| | | | |
|---|---|---|---|
| 5,124,697 | 6/1992 | Moore | 340/825.44 |
| 5,142,279 | 8/1992 | Jasinski et al. | 340/825.44 |
| 5,239,677 | 8/1993 | Jasinski . | |
| 5,283,570 | 2/1994 | DeLuca et al. | 340/825.44 |
| 5,463,382 | 10/1995 | Nikas et al. | 455/38.1 |

Primary Examiner—Reinhard J. Eisenzopf
Assistant Examiner—Nguyen Vo
Attorney, Agent, or Firm—James A. Lamb

[57] ABSTRACT

A system controller (102) schedules an outbound selective call address (410) and an outbound message (430) at a position within a transmission cycle (330) of a synchronous outbound signaling protocol. The position and the outbound selective call address (410) are stored and linked to each other. The transmission cycle (330) is transmitted. A selective call transceiver (106) receives the transmission cycle (330), recovers the outbound message (430), and generates a response signal which includes an inbound address. The inbound address is determined from the position of the outbound selective call address (410) within the transmission cycle and is included in an inbound message which is transmitted. The system controller (102) recovers the inbound message, determines the position from the inbound address, and identifies the inbound message as being associated with the selective call transceiver (106) by the linking of the position to the outbound selective call address (410) stored within the system controller (102).

23 Claims, 7 Drawing Sheets

METHOD AND APPARATUS FOR IDENTIFYING AN INBOUND MESSAGE IN A RADIO COMMUNICATION SYSTEM

FIELD OF THE INVENTION

This invention relates in general to two way data communication systems and in particular to the identification of an inbound message generated by a selective call transceiver in a two way data communication system having a synchronous outbound signaling protocol.

BACKGROUND OF THE INVENTION

The coverage area of selective call radio communication systems has been growing steadily, to the point where there are now nationwide systems in service and worldwide systems are in development. As these selective call radio communication systems grow, a need to uniquely identify all selective call radios that are authorized to operate on a particular selective call radio communication system has resulted in the assignment of longer identification numbers, or addresses, to the selective call radios, as well as the provision for the longer identification numbers within the signaling protocols used in the systems to communicate with the selective call radios.

In addition to providing for longer identification numbers, paging protocols for selective call radio communication systems, which have typically provided only outbound (from system to selective call radio) communication in narrowband (12.5 to 50 KHz) radio channels, have recently evolved to where some protocols provide high speed (greater than 4800 bits per second) outbound information transfer using a synchronous outbound protocol. The use of a synchronous outbound protocol improves the throughput by reducing the amount of air time used for bit and word synchronization of the receiver to the transmitted signal, and also improves battery savings in the selective call radios. Examples of high speed synchronous outbound protocols are the FLEX™ and ERMES (European Radio Message System) protocols, which provide for identification numbers having lengths of, respectively, 42 and 35 bits to assure uniqueness of all selective call radio units. Another evolutionary advancement in paging systems is the introduction of two way systems which provide for acknowledgment of an outbound message on an inbound channel, and may also provide for information other than acknowledgments to be communicated on the inbound channel. An example of a protocol for two way paging is ReFLEX™, which is based on the FLEX™ protocol for the outbound channel protocol.

In two way data radio communication systems, throughput is a primary design concern for both outbound and inbound information communication. Improved throughput allows more efficient use of limited radio spectrum and, generally, reduced latency (delay of delivery of the information). Another primary design concern in two way data radio communication systems is reduced power consumption of portable selective call radios. The use of lengthy identification numbers in both the outbound and inbound channels of a two way radio communication system increases the message lengths of the messages in both the inbound and outbound channels. In the inbound channel, the affect of increased message lengths on throughput is typically more severe than the affect in the outbound channel because of the random nature of contending inbound messages. In order to avoid loss of inbound messages which contend with each other, the inbound messages in many systems are organized by the system. Typical techniques for organizing inbound channel information include random access channel contention techniques, such as the ALOHA contention techniques and variations thereof (e.g., slotted ALOHA), well known to one of ordinary skill in the art, and scheduled responses, in which inbound information messages are scheduled by a system controller using outbound messages. These techniques amplify the negative affect of long identification numbers on throughput compared to the affect on outbound messages because, on the average, more than one message is sent for each inbound message to achieve the organization needed, and all the inbound messages must be identified. Reduced throughput of inbound messages, particularly by increasing the number of inbound messages, also reduces the average battery life of selective call radios used for generating inbound information, such as acknowledgment or status information.

Thus, what is needed is a technique for improving inbound throughput and the battery life of selective call radios in a two way radio communication system having a synchronous outbound protocol.

SUMMARY OF THE INVENTION

Accordingly, in a first aspect of the present invention, a method is for use in a radio communication system having a synchronous outbound signaling protocol. The method includes the following steps within a system controller: scheduling, storing, and transmitting. In the step of scheduling, an outbound selective call address and an outbound message are scheduled at a position within a transmission cycle of the synchronous outbound signaling protocol. Each position is uniquely identified. In the step of storing, the outbound selective call address, the outbound message, and a position of a predetermined one of the outbound selective call address and the outbound message are stored. In the step of transmitting, the outbound selective call address and the outbound message are transmitted within the transmission cycle. The method further includes the following steps within a selective call transceiver having at least one embedded selective call address: receiving the transmission cycle, generating an inbound address, including the inbound address in an inbound message, and transmitting the inbound message. In the step of generating an inbound address, an inbound address is generated when the outbound selective call address matches a predetermined portion of one of the at least one embedded selective call address, the inbound address being determined from the position within the transmission cycle of the predetermined one of the outbound selective call address and the outbound message. In the step of including the inbound address in the inbound message, the inbound address is included in the inbound message when the inbound message is transmitted within a predetermined response period after the outbound message is received. The method further includes the following steps within the system controller: receiving the inbound message and identifying the inbound message. In the step of identifying the inbound message, the inbound message is identified based on the inbound address included in the inbound message and the position within the transmission cycle stored in the step of storing.

Accordingly, in a second aspect of the present invention, a radio communication system includes a system controller and a selective call transceiver. The system controller is for generating a synchronous outbound signaling protocol. The system controller includes a scheduler, a memory, and a cell site controller. The scheduler is for scheduling an outbound selective call address and an outbound message included within a transmission cycle of the synchronous outbound signaling protocol. The outbound selective call address is scheduled at a position within the transmission cycle, and the position is identified by unique identities of protocol divisions of the synchronous outbound signaling protocol. The memory is coupled to the scheduler and is for storing the position and the outbound selective call address, and is for linking the position with the outbound selective call address. The cell site controller is coupled to the scheduler and is for controlling a transmitter which transmits the transmission cycle. The selective call transceiver stores at least one embedded selective call address, and includes a receiver for receiving the transmission cycle, a controller, an alert device, a response element, and a transmitter. The controller is for recovering the outbound message included in the transmission cycle, for generating a response signal when the outbound selective call address matches a predetermined portion of one of the at least one embedded selective call address, and for identifying the position within the transmission cycle at which a predetermined one of the outbound message and outbound selective call address is located. The alert device is coupled to the controller and is for generating a sensible alert in response to the response signal. The response element is coupled to the controller and is for generating a inbound address in response to the response signal. The inbound address is determined from the position of one of the outbound message and the outbound selective call address within the transmission cycle. The response element is also for including the inbound address in an inbound message when the inbound message is transmitted within a predetermined response period after the outbound message is received. The transmitter is coupled to the response element and is for transmitting the inbound message. The cell site controller of the system controller is for receiving the inbound message. The system controller further includes a response identifier coupled to the memory and the cell site controller. The response identifier is for determining the position within the transmission cycle from the inbound address and identifying the inbound message as being associated with the selective call transceiver by the linking of the position within the synchronous outbound signaling protocol to the outbound selective call address.

Accordingly, in a third aspect of the present invention, a system controller is used in a radio communication system for generating a synchronous outbound signaling protocol. The system controller includes a scheduler, a memory, a cell site controller, and a response identifier. The scheduler is for scheduling an outbound selective call address and an outbound message included within a transmission cycle of the synchronous outbound signaling protocol. The memory is coupled to the scheduler and is for storing a position of a predetermined one of the outbound selective call address and the outbound message. The cell site controller is coupled to the scheduler and to a fixed transmitter and receiver and is for controlling the fixed transmitter which transmits the transmission cycle. The cell site controller is also for receiving an inbound message transmitted by a selective call transceiver. The response identifier is coupled to the memory and the cell site controller and is for determining the position from an inbound address included in the inbound message and is also for identifying the inbound message based on the inbound address included in the inbound message and the position stored in the memory.

Accordingly, in a fourth aspect of the present invention, a selective call transceiver is for use in a radio communication system having a synchronous outbound signaling protocol. The selective call transceiver includes a receiver, a memory, a controller, an alert device, a response element, and a transmitter. The receiver is for receiving an outbound selective call address and an outbound message included within a transmission cycle of the synchronous outbound signaling protocol. The memory is for storing at least one embedded selective call address. The controller is coupled to the receiver and the memory and is for recovering the outbound selective call address and outbound message. The controller is also for generating a response signal when the outbound selective call address matches a predetermined portion of one of the at least one embedded selective call address and for identifying a position of a predetermined one of the outbound selective call address and the outbound message within the transmission cycle. The alert device is coupled to the controller and is for generating a sensible alert in response to the response signal. The response element is coupled to the controller and is for generating a inbound address in response to the response signal. The inbound address is determined from the position. The response element is also for including the inbound address in an inbound message when the inbound message is transmitted within a predetermined response period after the outbound message is received. The transmitter is coupled to the response element for transmitting the inbound message.

DETAILED DESCRIPTION OF THE DRAWINGS

Described herein below, is a method and apparatus for substantially shortening an inbound address used in inbound messages transmitted in a radio communication system which uses a synchronous digital outbound signaling protocol and which uses long selective call transceiver addresses (typically more than 30 bits) which allow for many millions of unique selective call addresses to be assigned. The method and apparatus is most beneficial for selective call transceivers which are very active in a radio communication system and which are transmitting short unsolicited inbound messages using a non-scheduled inbound signaling protocol known as ALOHA or slotted ALOHA, which are methods for inbound message contention and random scheduling of response to a command included in an outbound message from the system controller 102. An example of a designated response message is a message initiated by the selective call transceiver 106, but which is not transmitted until after a designated response is received from the system controller 102. The designated response command, in turn, is sent by the system controller 102 after an inbound message requesting permission to transmit the designated response message is communicated from the selective call transceiver 106 to the system controller 102. The response messages are preferably transmitted at a time designated within the outbound message or command, but alternatively can be transmitted using a non-scheduled protocol, such as the ALOHA or slotted ALOHA protocol, which are well known to one of ordinary skill in the art. An unsolicited message is an inbound message transmitted by a selective call transceiver 106 without having received an outbound message which requires a response. An example of an unsolicited message is an inbound message from a selective call transceiver 106 which alerts the radio communication system 100 that the selective call transceiver 106 is within radio range of the radio communication system 100. An unsolicited message can include a request to transmit a designated response and can include data such as alphanumeric, fax, or digitized voice data. Unsolicited messages are transmitted using an ALOHA or slotted ALOHA protocol. The inbound and outbound messages are included in outbound radio signals transmitted from, and inbound radio signals received by, a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network.

It will be appreciated that each of the selective call transceivers 106 is one of a class of radio terminal devices such as pagers having acknowledge back capability, conventional mobile and portable cellular telephones, mobile data radio terminals, mobile cellular telephones having attached data terminals, and mobile radios (trunked and non-trunked) having data terminals attached. Each of the selective call message retries well known to one of ordinary skill in the art. The method and apparatus can briefly be described as using a position of a selective call address to define an inbound address. The position of the selective call address is the position of the selective call address most recently used in an outbound transmitter cycle of the synchronous protocol. The position is identified generally in terms of protocol divisions of the outbound protocol and is rendered into a short inbound address.

Figure 1:
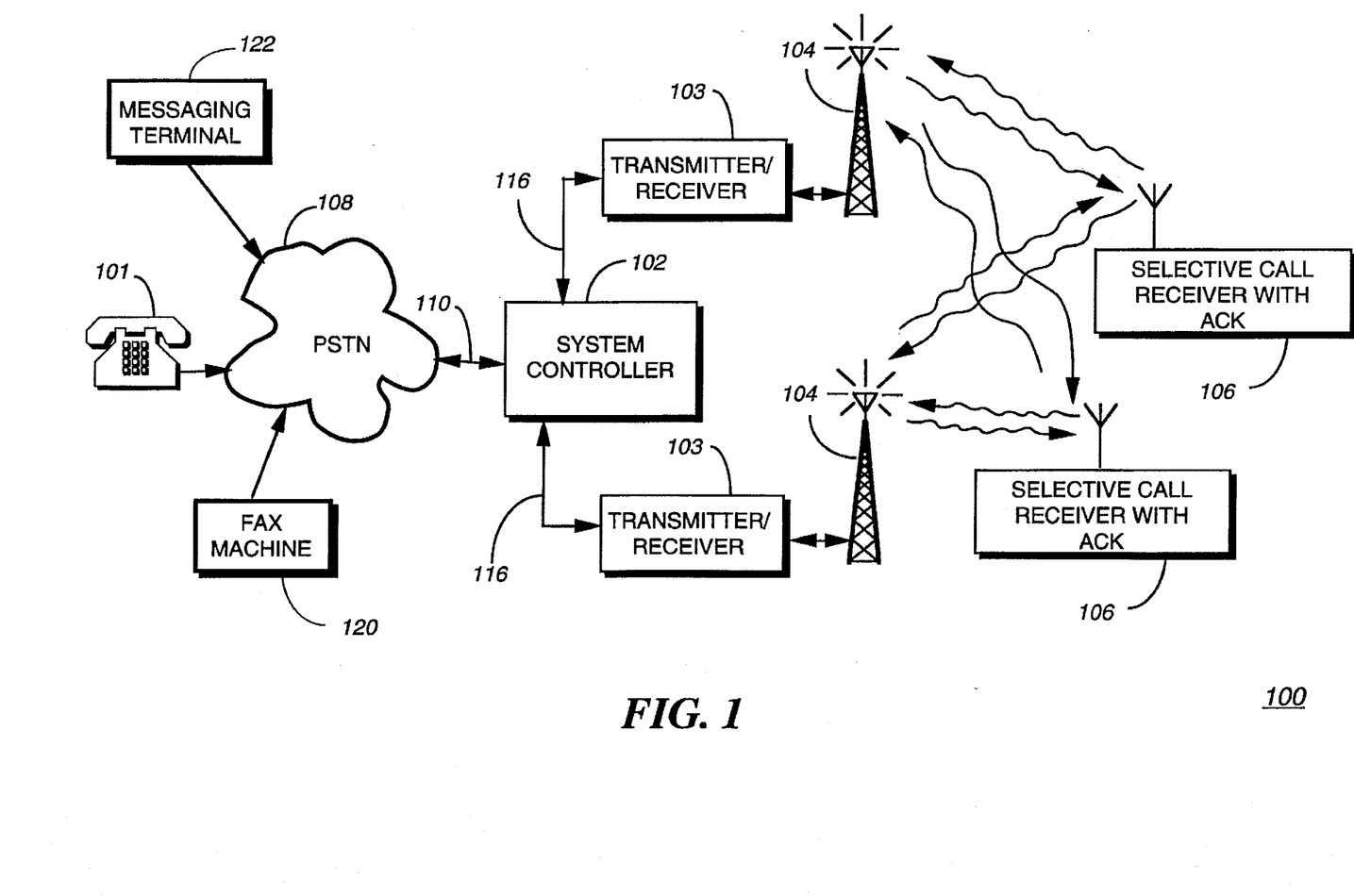
FIG. 1 is an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101, a facsimile machine 120 or a messaging terminal 122, connected through a conventional switched telephone network (STN) 108 by conventional telephone links 110 to a system controller 102. The system controller 102 oversees the operation of a plurality of radio frequency transmitter/receivers 103, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, and response commands, for transmission by the radio frequency transmitter/receivers 103 to a plurality of selective call transceivers 106. The system controller 102 further functions to decode inbound messages, including unsolicited and response messages, received by the radio frequency transmitter/receivers 103 from the plurality of selective call transceivers 106. Examples of response messages are acknowledgments and designated response messages. An acknowledgment is a response to an outbound message initiated at the system controller 102. An example of an outbound alphanumeric message intended for a selective call transceiver 106 is a page message entered from the telephone 101. The acknowledgment indicates successful reception of the outbound message. A designated response message is a message sent from a selective call transceiver in transceivers 106 assigned for use in the radio communication system 100 has at least one address assigned thereto which is a unique selective call address. The selective call address enables the transmission of a message from the system controller 102 only to the addressed selective call transceiver 106.

Figure 2:
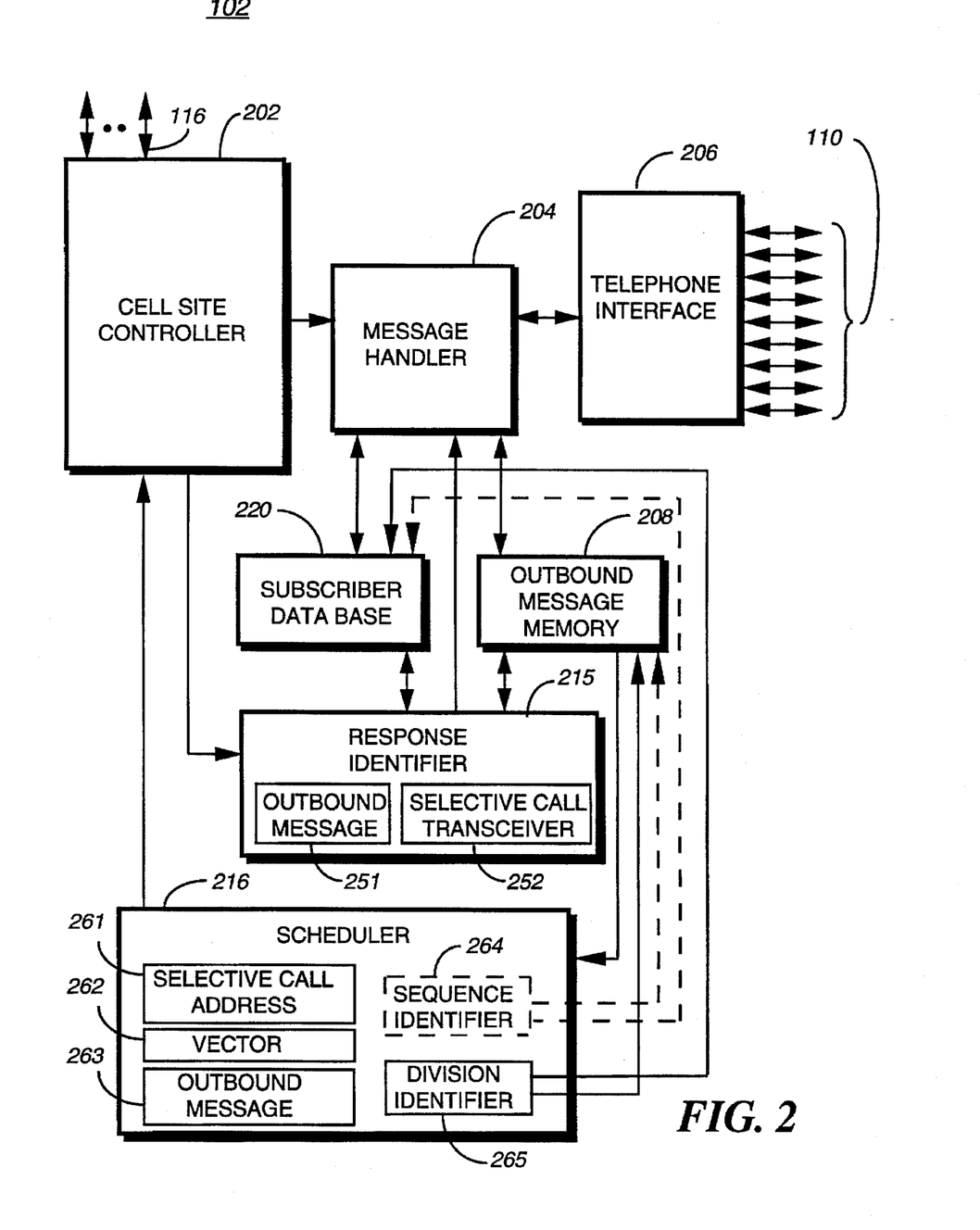
FIG. 2 is an electrical block diagram of a system controller, in accordance with the preferred embodiment of the present invention.

Referring to FIG. 2, an electrical block diagram of the system controller 102 is shown, in accordance with the preferred embodiment of the present invention. The system controller 102 comprises a cell site controller 202, a message handler 204, an outbound message memory 208, a subscriber data base 220, a telephone interface 206, a response identifier 215, and a scheduler 216. The cell site controller 202 is coupled to the radio frequency transmitter/receivers 103 (FIG. 1) by the links 116. The cell site controller 202 couples selective call addresses and outbound messages to the transmitter/receivers 103 and controls the transmitter/receivers 103 to transmit transmission cycles which include the selective call addresses and outbound messages. The cell site controller 202 also processes inbound messages from the selective call transceivers 106. The inbound messages are received by the transmitter/receivers 103 and coupled to the cell site controller 202. The message handler 204, which routes and processes messages, is coupled to the telephone interface 206, the subscriber data base 220, and the outbound message memory 208. The telephone interface 206 handles the switched telephone network 108 (STN) (FIG. 1) physical connection, connecting and disconnecting telephone calls at the telephone links 110, and routing the audio signals between the telephone links 110 and the message handler 204. The subscriber data base 220 stores information for each subscriber, including a correlation between a selective call address assigned to each selective call transceiver 106 and the telephone number used within the STN 108 to route messages and telephone calls to each selective call transceiver 106, as well as other subscriber determined preferences, such as hours during which messages are to be held back from delivery to the selective call transceiver 106. The outbound message memory 208 is for storing a queue of messages which are queued for delivery to at least one of the plurality of selective call transceivers 106, wherein each message of the queue of messages is associated with a selective call address, also stored in the outbound message memory 208, of one of the plurality of selective call transceivers 106 for which each message is intended. The scheduler 216, which is coupled to the outbound message memory 208, the cell site controller 202, and the subscriber data base 220, schedules outbound messages and the selective call addresses associated therewith within a transmission cycle. In accordance with the preferred embodiment of the present invention, the scheduler comprises a selective call address element 261, a vector element 262, an outbound message element 263, and a division identifier element 265, the functions of which are described in more detail below. The response identifier 215, which is coupled to the cell site controller 202, the subscriber data base 220, the message handler 204, and the outbound message memory 208, comprises a selective call transceiver element 252 which identifies inbound messages as being associated with one of the selective call transceivers in the subscriber data base 220 and comprises an outbound message element 251 which identifies response messages as being associated with one of the outbound messages in the outbound message memory 208. The response identifier routes the identified messages to the message handler 204 for further processing of the messages. As one example of an operation of the system controller 102, the delivery of an outbound message stored in the outbound message memory 208 is completed when the outbound message has been communicated to the intended selective call transceiver 106, a message response is communicated back to the system controller 102 from the selective call transceiver 106, and the message response is identified by the outbound message element 251 of the response identifier 215 as being a response message generated specifically for the outbound message. In this example, the message handler 204 notifies the originator that the message has been received at the selective call transceiver 106.

System controller 102 is preferably a model MPS2000® paging terminal manufactured by Motorola, Inc., of Schaumburg Ill., modified with special firmware elements in accordance with the preferred embodiment of the present invention, as described herein. The cell site controller 202, the message handler 204, the telephone interface 206, the outbound message memory 208, the subscriber data base 220, the scheduler 216, and the response identifier 215 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

Figure 3:
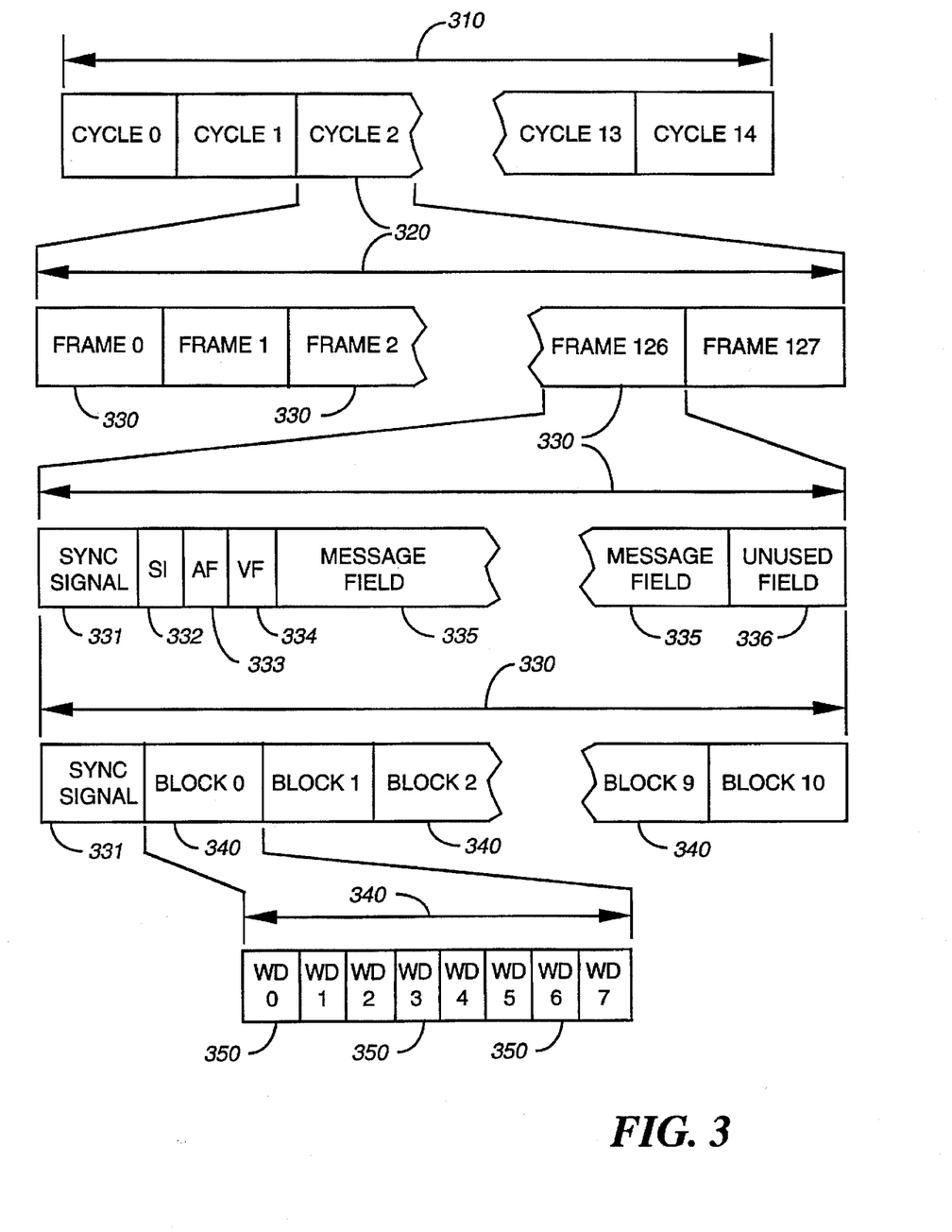
FIGS. 3 and 4 are timing diagrams illustrating the transmission format of an outbound signaling protocol utilized by the radio communication system of FIG. 1 to transmit a message, in accordance with the preferred embodiment of the present invention.

Referring to FIG. 3, a timing diagram illustrating features of the transmission format of an outbound signaling protocol utilized by the radio communication system of FIG. 1 to transmit a message from the system controller 102 to the selective call transceiver 106 is shown, in accordance with the preferred embodiment of the present invention. The signaling protocol is preferably the FLEX™ protocol, which is a synchronous outbound signaling protocol. The signaling protocol is subdivided into protocol divisions, which are an hour 310, a cycle 320, a frame 330, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the frames 330. Bit rates of 1600 bits per second (bps), 3200 bps, or 6400 bps are usable during each frame 330. The bit rate of each frame 330 is communicated to the selective call transceivers 106 during the synchronization signal 331. When the bit rate is 1600 bps, 8 thirty two bit uniquely identified words 350 are transmitted in each frame 330. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the error correction capability of the protocol. The transmission cycle referred to above in the description of the system controller 102 with reference to FIG. 2 comprises a frame 330.

Information is included in each frame 330 in information fields, comprising system information in a system information field (SI) 332, one or more selective call addresses in an address field (AF) 333, one or more vectors in a vector field (VF) 334, one or more outbound messages in a message field 335, and an unused field 336 having no useful information therein. Each vector in the vector field 334 corresponds to one of the addresses in the address field 333. Each outbound message in the message field 335 corresponds to one of the addresses in the address field 333. The boundaries of the information fields 332, 333, 334, 335, 336 are defined by the words 350, not by the blocks 340, and the length of the information fields 332, 333, 334, 335, 336 are variable, depending on factors such as the type of system information included in the system information field 332, the type of addresses used, and the amount of information in each message. Thus, the length of each of the information fields 332, 333, 334, 335, 336 can be shorter or longer than a block 340. The unused field 336 can be zero length when the total of the lengths of the other information fields 332, 333, 334, 335 equals eleven blocks 340. All outbound messages intended for a particular selective call transceiver 106 are preferably scheduled for transmission in a predetermined frame 330 of each cycle 320.

Figure 4:
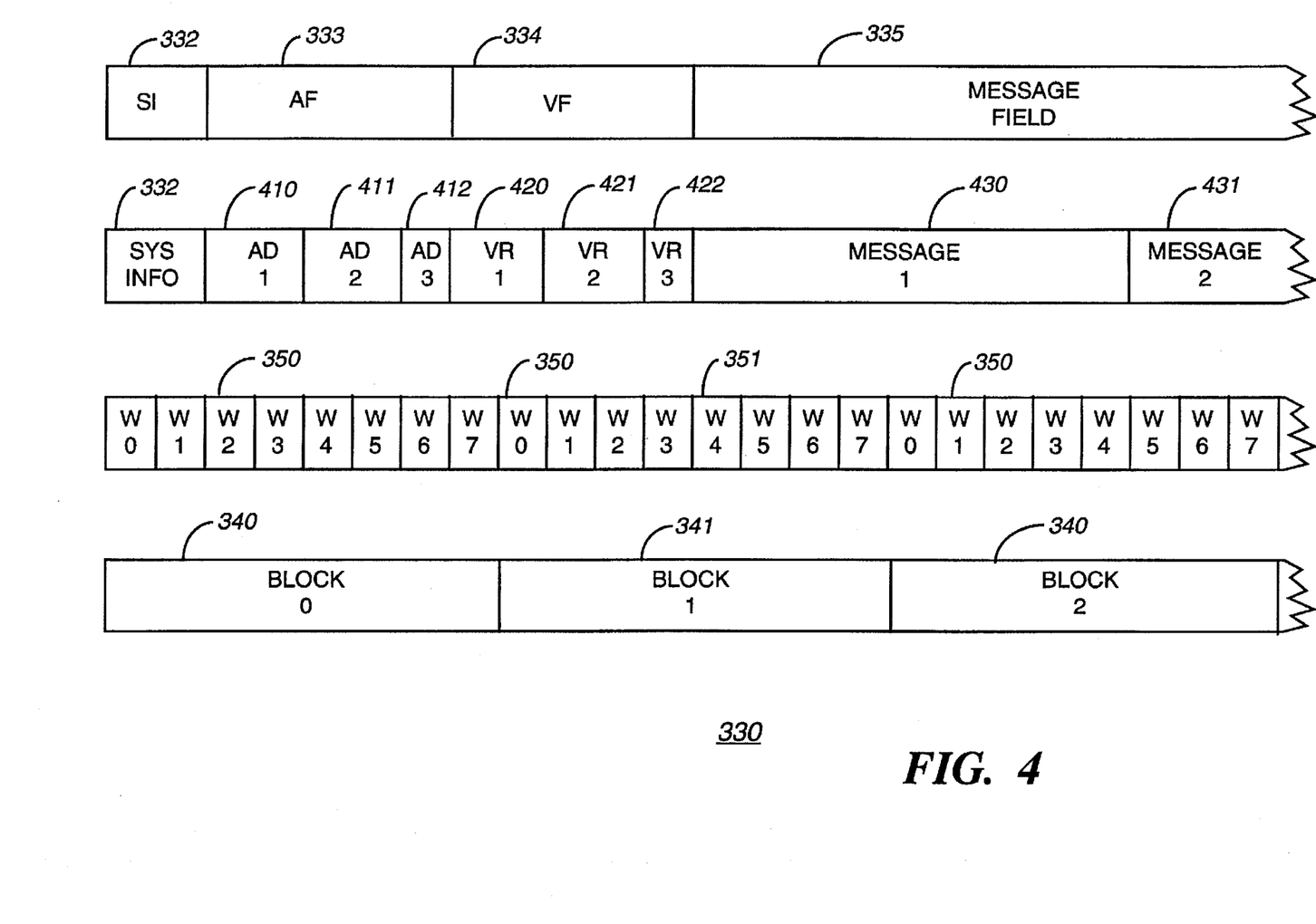

Referring to FIG. 4, a timing diagram illustrating a portion of a frame 330 of the outbound signaling protocol utilized by the radio communication system of FIG. 1 is shown, in accordance with the preferred embodiment of the present invention. The diagram shows the system information field 332, the address field 333, the vector field 334, and a portion of the message field 335. Three addresses 410, 411, 412, three vectors 420, 421, 422, a message one 430, and part of message two 431 are shown in FIG. 4. The addresses 410 and 411 are two word addresses, or long addresses, of first and second selective call transceivers 106, and the address 412 is a one word, or short address of a third selective call transceiver 106. Each short address includes 21 information bits which can be used to uniquely identify approximately two million "local" addresses. Each long address word includes 42 information bits which are used to uniquely identify approximately one billion "nationwide" addresses. The short and long addresses are appropriate for radio communication systems which are presently in the planning and installation stages, which can have hundreds of thousands of subscribers in a large metropolitan area, and many more in a nationwide or worldwide area. The selective call addresses stored in the subscriber data base 220 of the system controller 102 are preferably stored as short addresses of selective call transceivers 106 which are assigned to the radio communication system 100 serviced by the system controller 102. The subscriber data base 220 also stores long addresses received from selective call transceivers 106 which are temporarily active in using the radio communication system 100, while the selective call transceivers 106 are active. The system controller 102 preferably includes the short address in the transmission cycle when communicating an outbound message to a selective call transceiver 106 which is assigned to the radio communication system 100 serviced by the system controller 102, and uses a long address (obtained from an inbound registration message transmitted by a selective call transceiver 106) when the selective call transceiver 106 is not assigned to the radio communication system 100 serviced by the system controller 102. The three vectors 420, 421, and 422 are associated, respectively, with the three addresses 410, 411, and 412, and the vectors 420, 421, and 422 have the same word length as the respective addresses 410, 411, and 412. Each of the vectors 420, 421, and 422 has information that identifies a position of the message which is also associated with the respective address. The position is identified by the starting word of the outbound message. For example, vector 420 has information that indicates that message one 430, which is intended for selective call transceiver 106 having selective call address 410; is located starting at word four 351 of block one 341 of the frame 330. A message can be communicated to more than one selective call transceiver 106, for example to two selective call transceivers 106, by including an address for each of the two selective call transceivers 106 in the address field 333, and having the vectors associated with each address point to the same message position. It will be appreciated that the selective call address is uniquely identifiable within the frame by the position of the address in the frame. It will also be appreciated that each message is uniquely identifiable in the frame by the position of the message in the frame, and that when a message is uniquely intended for one selective call transceiver 106, the message is further uniquely identifiable by the position of the address or the vector within the frame. It will be further appreciated that, due to the interleaving mentioned above, the position (that is, the starting word) of an address or vector or message in the FLEX™ protocol is not a sequential timing position because the bits of the words are interleaved, but is a unique identifier nonetheless.

When an inbound message is communicated to the system controller 102 in a radio communication system which uses the FLEX™ protocol for an outbound synchronous protocol, and when the inbound message is communicated using a non-scheduled protocol such as ALOHA or slotted ALOHA, a method which avoids any possible ambiguity concerning the identity of the selective call transceiver 106 generating the inbound message (or alternatively, the identity of the outbound message to which the response is being made) is for the selective call transceiver 106 to include a long address as defined in the FLEX™ protocol within the inbound message. As described above, the long address requires 64 bits, of which 42 are information bits. In accordance with the preferred and alternate embodiments of the present invention, however, and as more fully described below, the position of the address, the vector, or the message is used in a portion of the such inbound messages instead, requiring far fewer information bits (e.g., 19 bits), and thus providing improved throughput in such a radio communication system 100 compared to using the long address.

It will be further appreciated that a synchronous outbound protocol other than FLEX™ can alternatively be used, when the alternate synchronous protocol uses selective call addresses or fields unique to an outbound message or selective call transceiver 106 which have a position in a transmission cycle identifiable by protocol division identifiers. An example of such a protocol is the European Radio Message System (ERMES) protocol, which uses protocol divisions comprising a sequence (comprising 60 uniquely identified cycles which total one hour), a cycle (comprising 5 uniquely identified subsequences which total one minute), a subsequence (comprising 16 uniquely identified batches which total 12 seconds), a batch (15 uniquely identified batches in each subsequence comprising one hundred fifty four uniquely identified codewords which each batch lasts 0.7392 seconds, plus one uniquely identified batch in each subsequence comprising one hundred ninety uniquely identified codewords which lasts 0.9120 seconds), and a codeword (lasting 0.0048 seconds, comprising 30 uniquely identified bits at a bit rate of 6250 bits per second). Within each batch, one or more initial, or short, addresses are included in an address field near the beginning of the batch which identify (not necessarily uniquely) selective call transceivers 106 intended to receive outbound messages which are also included in the batch. Each initial address is included in one 30 bit codeword and consists of 18 bits of information. The outbound messages in the batch are not necessarily linked by position to the initial address. Instead, a longer version of each selective call address, is included near the beginning of each outbound message to identify the outbound message as being intended for the selective call transceiver 106. The longer address of the selective call address includes the initial address as a subset. When the selective call transceiver 106 is assigned to the radio communication system 100, the longer address is 22 bits long, and is termed the local address. When the selective call transceiver 106 is not assigned to the radio communication system 100, the longer address is 35 bits long, and is termed the Radio Identity Code. Within each batch is also included a system information field which has information identifying the radio communication system 100 and other system information, such as a country and a system operator. The bits and words in each batch are transmitted in an interleaved fashion using techniques well known to one of ordinary skill in the art to improve the error correction capability of the protocol. The transmission cycle comprises a batch. The selective call addresses stored in the subscriber data base 220 of the system controller 102 are preferably stored as RIC addresses of selective call transceivers 106 which are assigned to the radio communication system 100 serviced by the system controller 102. The subscriber data base 220 also stores RIC addresses received from selective call transceivers 106 which are temporarily active in using the radio communication system 100, while the selective call transceivers 106 are active.

When an inbound message is communicated to the system controller 102 in a radio communication system using the ERMES protocol for an outbound synchronous protocol, and when the inbound message is communicated using a non-scheduled protocol such as ALOHA or slotted ALOHA, a method which avoids any possible ambiguity concerning the identity of the selective call transceiver 106 generating the inbound message (or alternatively, the identity of the outbound message to which the response is being made) is to include the Radio Identity Code (RIC) address, as defined in the ERMES protocol, in the inbound message. The RIC address in the ERMES protocol consists of 35 bits (and is a superset of the local and initial address), and is intended to uniquely identify all selective call transceivers assigned to any operational system in the world. In accordance with a fourth alternate embodiment of the present invention, however, and as more fully described below, the position of the initial address is used in a portion of the inbound messages instead, requiring far fewer information bits (e.g., 19 bits), and thus providing improved throughput in such a system compared to using the RIC address.

Figure 5:
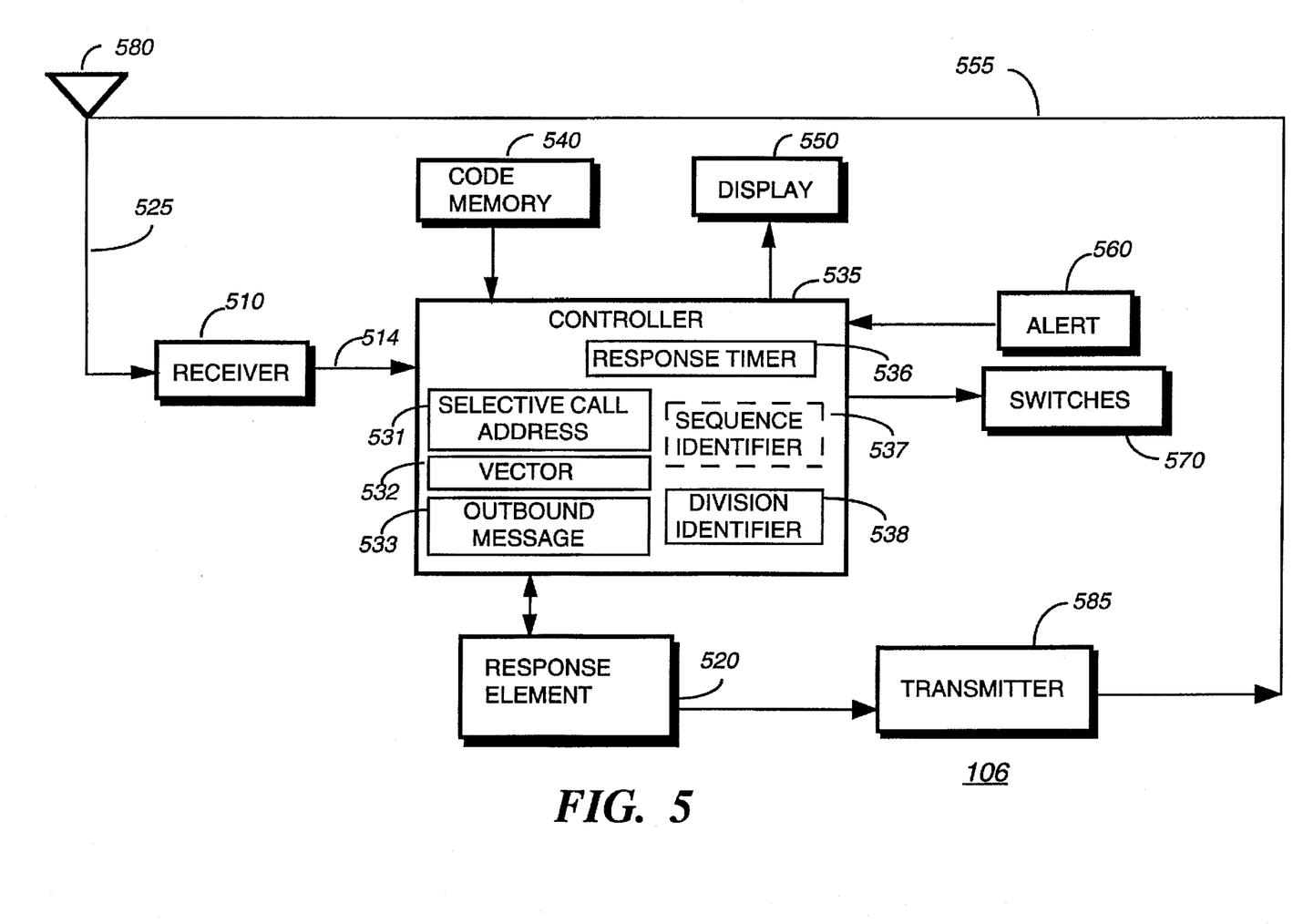
FIG. 5 is an electrical block diagram of a selective call transceiver 106 with acknowledge back capability, in accordance with the preferred embodiment of the present invention.

Referring to FIG. 5, an electrical block diagram of a selective call transceiver 106 with inbound message capability is shown, in accordance with the preferred embodiment of the present invention. The selective call transceiver 106 includes an antenna 580 for intercepting and transmitting radio signals. The intercepted signal 525 is a predetermined frame 330 of a cycle 320 of the FLEX™ protocol, which includes, for example, selective call address 411, vector 421, and message two 431, which are an outbound selective call address, an outbound message, and the vector associated with the outbound selective call address and which points to the outbound message. Message two 431 includes information intended for a selective call transceiver 106, such as a paging message intended for display at the selective call transceiver 106, or includes a command, such as a command for the selective call transceiver 106 to respond with a response message which includes information generated at the selective call transceiver 106. An acknowledgment of the message two 431 is required from the selective call transceiver 106. The antenna 580 is coupled to a conventional receiver 510 and a conventional transmitter 585. The intercepted signal 525 is coupled to the receiver 510 wherein the intercepted signal 525 is received, which includes filtering to remove undesirable energy at off channel frequencies, amplification of the filtered signal, and demodulation of the amplified signal. The receiver 510 thereby generates a demodulated signal 514 which is coupled to a controller 535. The controller 535 comprises a selective call address element 531, a vector element 532, an outbound message element 533, a sequence identifier element 537, a division identifier element 538, and a response timer 536 the functions of which will be described in more detail below. The demodulated signal 514 includes the information transmitted in the frame 330, with errors possibly induced during the radio communication of the signal. The controller 535 recovers the information in the demodulated signal 514 using error correction and detection techniques well known to one of ordinary skill in the art. The controller 535 is coupled to a code memory 540, in which are stored a short (one word) address and a long (two word) address assigned to the selective call transceiver 106, which are also referred to herein as embedded addresses. When the controller 535 determines that the information is error free, the selective call address element 531, the vector element 532, and the outbound message element 533, respectively, identify the positions in the recovered frame 330 of the selective call addresses, the vectors associated with the selective call addresses, and the outbound messages. Each portion of the frame 330 which comprises an outbound messages is identified as a position in the frame 330 using a vector which, in turn, has a position determined by the position of an outbound selective call address, as described above with reference to FIG. 4.

The controller 535 compares each outbound selective call address in the address field 333 of the predetermined frame 330 to the embedded addresses. When no address in the recovered frame 330 matches an embedded selective call address, the controller 535 ceases further processing of the demodulated signal 514 and puts the selective call transceiver 106 into a power down mode until a later time when a subsequent predetermined frame 330 is transmitted which potentially includes outbound messages for the selective call transceiver 106. When any outbound selective call address in the recovered frame 330 and the embedded selective call address do match, the controller 535 continues processing the recovered information. The processing includes generating an alert signal, resetting the response timer 536, storing the position in the frame of the outbound selective call address which matches the embedded address, generating a response signal when an acknowledgment is required or when a response command is included in the outbound message. The response timer 536 has two states, "timing" and "timed out". The response timer 536 is reset to time out after a predetermined response period after the last word of the outbound message is received at the antenna 580 of the selective call transceiver 106. In accordance with the preferred embodiment of the present invention, the predetermined response period is 15 cycles (one hour). The controller 535 is coupled to a set of switches 570, to which the controller 535 is responsive for setting and controlling a plurality of operational modes of the selective call transceiver 106. Depending on the operational mode of the selective call transceiver 106, and depending on the contents of the outbound message, the controller 535 couples information included in the outbound message to a display 550 for presentation and stores information included in the outbound message for later presentation. Also depending on the operational mode of the selective call transceiver 106, a sensible alert device 560, for example, a tone alert device or a vibration alert device, is activated in response to the alert signal.

In response to the response signal generated by the controller 535, the division identifier element 538 identifies the position of the outbound selective call address by using the protocol divisions (word, block, frame, and/or cycle), and stores the position for later reference. For the example shown in FIG. 3 and FIG. 4, the position of the outbound selective call address associated with message 2 is word four, block zero, frame one hundred twenty six, cycle two. Thus, in this example, the position is identified by using all of the protocol divisions in a group of protocol divisions consisting of a cycle, a frame, a block, and a word of a FLEX™ protocol. Also, in this example, the position identity of each of the protocol divisions is a number. The largest protocol division which is required to be identified and stored is determined by the predetermined response period. In the preceding example, the largest such protocol division is the hour. As another example, when the response is expected within a one cycle duration, the position of the outbound selective call address associated with message two in FIG. 4 is stored as word four, block zero, and frame one hundred twenty six. In a third example, when the response is expected within three cycles duration, the position of the outbound selective call address associated with message two in FIG. 4 is stored as word four, block zero, and frame one hundred twenty six, and cycle two. In accordance with the preferred embodiment of the present invention, a response element 520 is coupled to the controller 535. The response element 520 generates an inbound address which is determined from the stored position of the outbound selective call address. The inbound address is preferably comprised of 19 bits. The 19 bits are defined to include 4 bits to identify the cycle 320 as one of the 15 cycles 320, 7 bits to identify the frame 330 as one of the one hundred twenty eight frames 330, 3 bits to identify the block 340 as one of the first eight blocks, and 5 bits to identify the word 350 as one of the 32 words (when the bit rate is 6400 bps). It will be appreciated that only the first 6 block numbers need identification, because the addresses can occupy at most one half of the blocks, since vectors of length equal to the addresses are required in the second half of the frame, in a worst case situation. The state of the response timer is coupled by the controller 535 to the response element 520, where the state is checked to verify that the state is "timing", whence a response message including the inbound address is coupled from the response element 520 to the transmitter 585, which generates an RF transmit signal 555. The RF transmit signal 555 is coupled to the antenna 580 and transmitted to the system controller 102. When the selective call transceiver 106 generates an unsolicited message which includes unsolicited information, the state of the response timer is checked by the response element 520. When the state is "timing", the response element 520 substitutes the inbound address in the unsolicited message and transmits the unsolicited message. When the state is "timed out", the selective call transceiver 106 sends in a "request to send" message using the long embedded address of the selective call transceiver 106. When the designated response command is received, the selective call transceiver 106 determines a new inbound address and responds with a response message including the unsolicited information and the new inbound address.

Referring again to FIG. 5, the selective call transceiver 106 for use in a radio communication system 100 using the ERMES protocol for an outbound synchronous protocol is shown, in accordance with a first alternate embodiment of the present invention. All functional elements are coupled the same as described with respect to the preferred embodiment. The functions performed by the functional elements are the same except as described as follows. The intercepted signal 525 is a predetermined one of the batches of the subsequence of the ERMES protocol, including an initial address, which is an outbound selective call address, and an outbound message which is associated with the initial call address. The outbound message includes information intended for a selective call transceiver 106 or includes a command. An acknowledgment of the outbound message is required from the selective call transceiver 106. The receiver 510 generates a demodulated signal and the controller recovers the information in the transmitted batch. The code memory 540 stores the 35 bit Radio Identity Code (RIC) assigned to the selective call transceiver 106. The RIC code is hereafter also referred to as the embedded address in accordance with the first alternate embodiment of the present invention. As described above, the 35 bit RIC is a superset of the 22 bit local address code and the 18 bit initial address code. When the decoder determines that the information is error free, the selective call address element 531 and the outbound message element 533, respectively, identify the positions in the recovered frame 330 of the initial addresses and the outbound messages.

The controller 535 compares the initial addresses near the beginning of the batch and determines a partial match when the initial address matches an initial address portion of the embedded address. The controller determines a match (complete match), and also determines the position of the outbound message intended for the selective call transceiver 106, when, at the beginning of one of the outbound message in the transmission cycle, a local address is found which matches a local address portion of the embedded address and the transmission cycle includes system information which matches a system information of the embedded address. The controller also determines a match (complete match), and determines the position of the outbound message intended for the selective call transceiver 106, when, at the beginning of one of the outbound message in the transmission cycle, a RIC is found which matches the embedded address. When a match is determined by the controller 535, the controller 535 continues processing the recovered information as described above in accordance with the preferred embodiment of the present invention. In accordance with the first alternate embodiment of the present invention, the predetermined response period is a sequence (one hour). The largest protocol division which is required to be identified and stored is determined by the predetermined response period. In this example, the largest such protocol division is the sequence and, an outbound message intended for a selective call transceiver can be uniquely identified on an inbound channel by a cycle identifier, a subsequence identifier, a batch identifier, and a initial address identifier, assuming that the inbound channel is uniquely associated with the outbound channel. The division identifier element 538 identifies the position of the outbound selective call address by using the protocol divisions word, batch, subsequence, and cycle, and stores the position for later reference. For the ERMES protocol, protocol division identifiers are numbers, except for batch identifiers which are letters. For example, the position of the outbound selective call address, or initial address, can be word 76, batch C, subsequence 3, cycle 45. Thus, in this example, the position is identified by using all of the protocol divisions in a group of protocol divisions consisting of a cycle, a subsequence, a batch, and a word of an ERMES protocol. Also in this example the position identity of each of the protocol divisions is one of a number and a letter. The response element 520 generates an inbound address which is determined from the position of the outbound selective call address. Inasmuch as the maximum number of initial addresses that can be included in a batch is one hundred forty, the initial address position can be represented by 8 bits. The total length of an inbound address which uniquely identifies the position of an initial address (or an outbound message) for the ERMES protocol is therefore 6 bits (60 cycles) plus 3 bits (5 subsequences) plus 4 bits (16 batches) plus 8 bits (initial address), or 21 bits.

The receiver 510 in the preferred and alternate embodiments of the present invention in FIG. 5 is preferably a conventional dual conversion receiver of a type well known to those skilled in the art, but can alternatively be a conventional single conversion or conventional zero intermediate frequency (ZIF) receiver. The code memory 540 is conventional EPROM, or conventional SRAM or another conventional memory type which is well known to those skilled in the art. The display 550 is an LCD display of a type well known to those skilled in the art, and the antenna 580, switches 570, and alert device 560 are devices also well known to those skilled in the art. The controller 535 and response element 520 are preferably portions of a microprocessor of the 68HC05 family made by Motorola, Inc. of Schaumburg, Ill. having unique firmware elements to provide the functions of the controller 535 and response element 520 described herein. The transmitter 585 is a conventional low power transmitter of a type well known to those skilled in the art.

Figure 6:
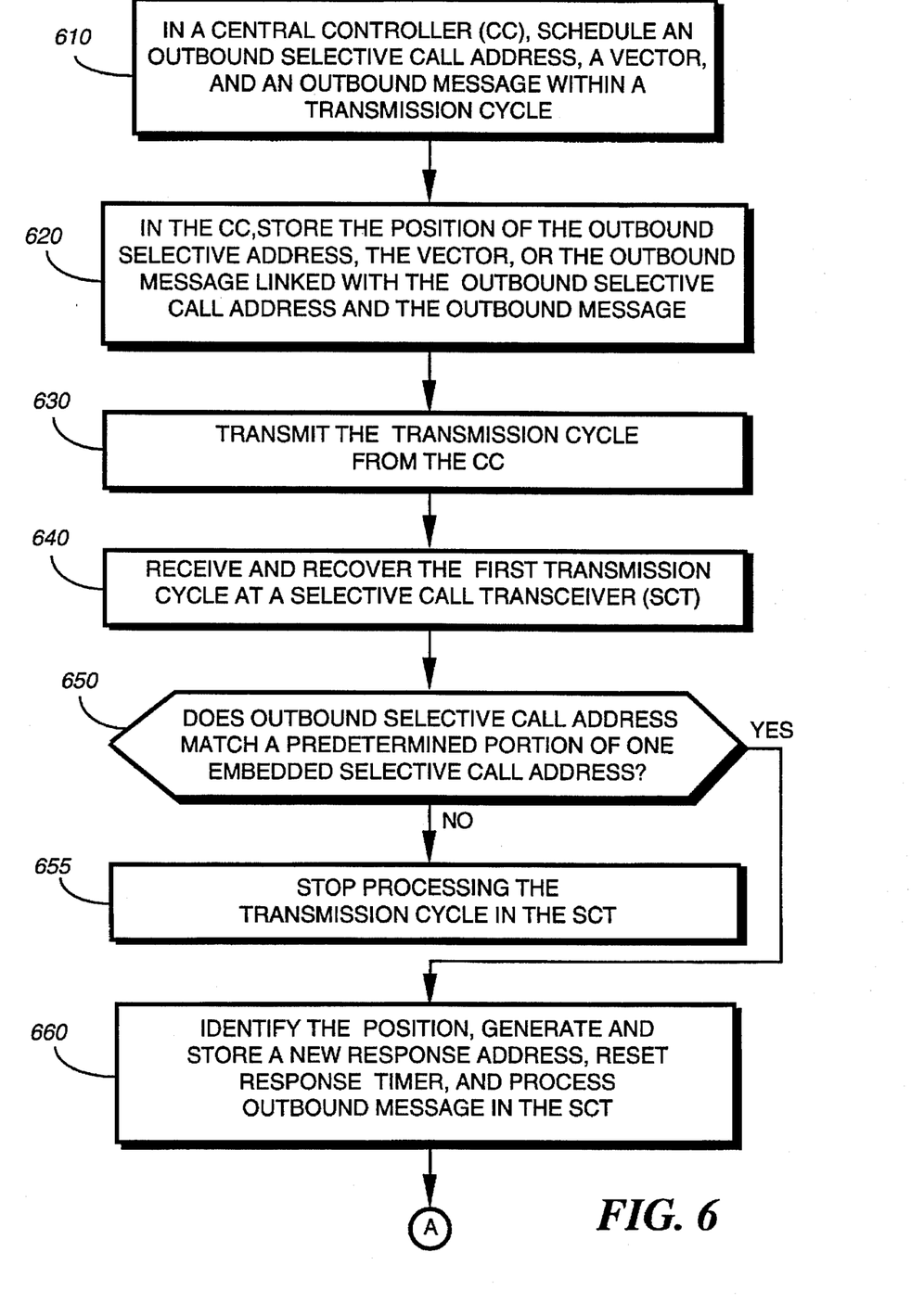
FIGS. 6 and 7 are a flow chart which illustrates a method for use in a radio communication system having a synchronous outbound signaling protocol, in accordance with the preferred embodiment of the present invention.
Figure 7:
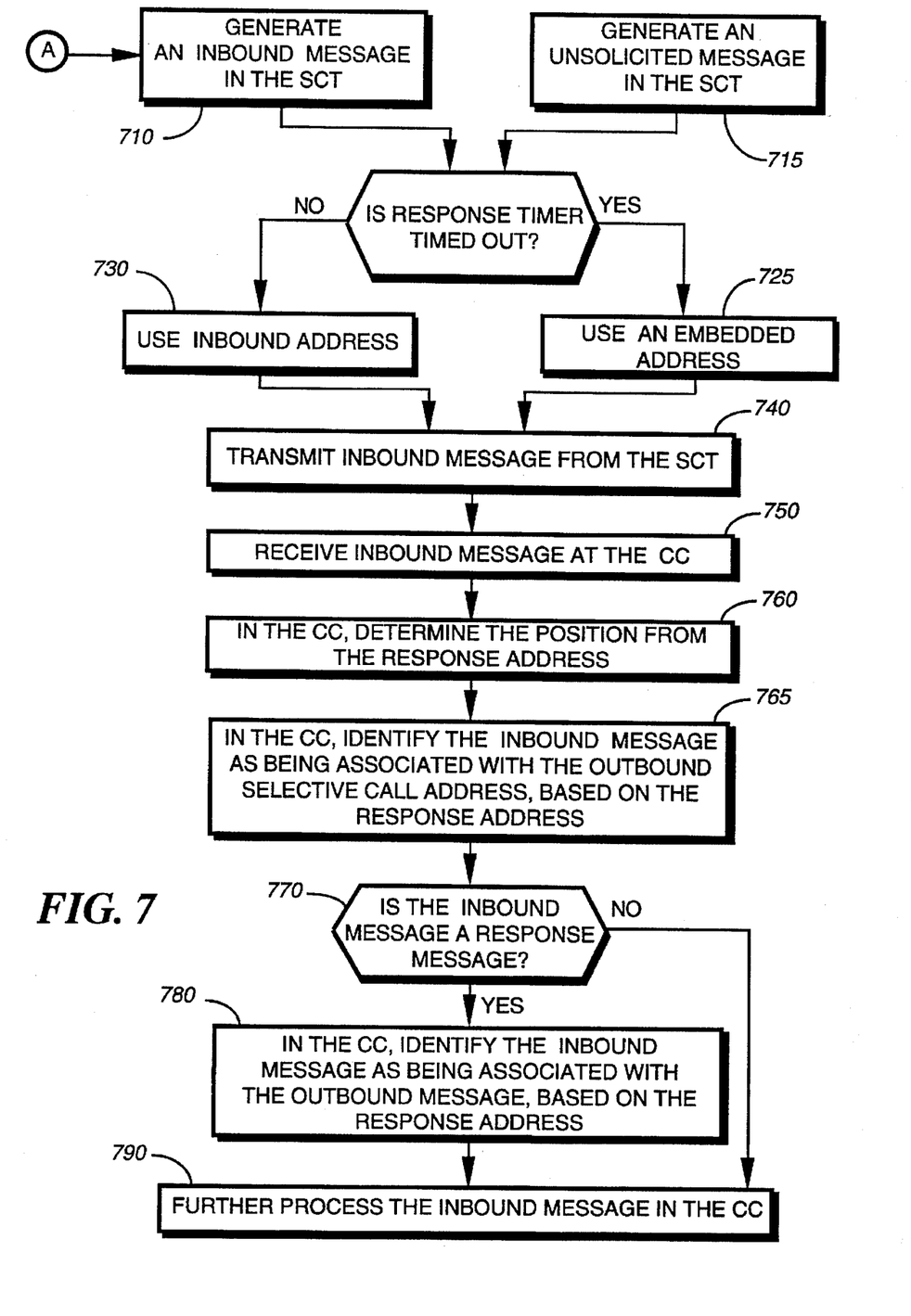

Referring to FIGS. 6 and 7, a flow chart illustrating a method for use in a radio communication system having a synchronous outbound signaling protocol is shown, in accordance with the preferred embodiment of the present invention. As described above, the signaling protocol includes a plurality of transmission cycles 330. As described above, the controller generates a queue of messages in an outbound message memory 208, each message associated with a selective call address. The selective call address is also stored in a subscriber data base 220 (FIG. 2). At step 610, the scheduler 216 (FIG. 2) schedules one of the messages by scheduling an outbound message 431, the outbound selective call address 411 associated with the outbound message, and the vector 421 associated with the outbound message for transmission within a transmission cycle 330 of the signaling protocol. The selective call address element 261 (FIG. 2), the vector element 262 (FIG. 2), and the outbound message element 263 (FIG. 2), respectively, assign positions for the outbound selective call address, the vector, and the outbound message within the transmission cycle. In accordance with the preferred embodiment of the present invention, the positions are identified by the division identifier element 265 (FIG. 2) as protocol divisions, for example, the outbound message could be at (i.e., start at) word twelve, block three, frame four, cycle six. The outbound selective call address 411 is a selective call address of a selective call transceiver 106 for which the outbound message is intended, and for which a response message is expected from the selective call transceiver. The response message and other inbound messages are expected from the selective call transceiver 106 within a predetermined response period. The predetermined response period preferably has a duration equivalent to one hour of the FLEX™ protocol. In accordance with the preferred embodiment of the present invention, the scheduled position of the outbound selective call address is stored by the scheduler 216 (FIG. 2) in memory in the system controller 102, linked with the outbound message stored in the outbound message memory 208 (FIG. 2) and the selective call address stored in the subscriber data base 220 (FIG. 2), at step 620. It will be appreciated that the position could be stored in memory locations, for example, within the outbound message memory 208, and/or the subscriber data base 220 (FIG. 2), or in another memory, for example a hard disk memory, and linked from the other memory to the selective call address stored in the subscriber data base 220 (FIG. 2) and the outbound message stored in the outbound message memory 208 (FIG. 2). As well known to one of ordinary skill in the art, the design of the memory storage location and linkage technique are influenced by such items as the partitioning and type of memory hardware used for the memories (e.g., hard disk, RAM, tape, etc.) and the data base program used to perform the linking. The position of the outbound selective call address is identified and stored as a word number, a block number, a frame number, and a cycle number, for example, the position of the outbound selective call address associated with message two in FIG. 4 is word four, block zero, frame one hundred twenty six, and cycle two. At step 630, the system controller 102 couples the outbound message 431, the outbound selective call address 411, and the vector 421 to the transmitter/receiver 103 for transmission within the transmission cycle 330.

The radio signal is received, at step 640, by a selective call transceiver 106, wherein the outbound selective call address and outbound message are recovered by error correcting and detecting decoding. When the selective call transceiver 106 determines, at step 650, that the transmission cycle does not include an outbound selective call address which matches one of at least one embedded selective call addresses stored within the selective call transceiver 106, the selective call transceiver 106 stops processing the transmission cycle at step 655. When the selective call transceiver 106 determines, at step 650, that the outbound selective call address included in the transmission cycle does match an embedded selective call address, the division identifier element 538 (FIG. 5) identifies the position of the selective call address, the response element 520 (FIG. 5) generates and stores a new inbound address, processes the outbound message, and resets a response timer 536 (FIG. 5) in the selective call transceiver 106 at step 660. The position of the selective call address is identified using protocol divisions. The inbound address is preferably 19 bits, defined as described above with respect to FIG. 5. The outbound message is processed as described above, for example, by displaying alphanumeric text on the display 550 (FIG. 5). The response timer 536 (FIG. 5) is reset to time out after the predetermined response period after the last word of the outbound message is received at the antenna 580 (FIG. 5) of the selective call transceiver 106. (The predetermined response period is described above between the descriptions of step 610 and 630).

In response to the outbound message, the response element 520 (FIG. 5) of the selective call transceiver 106 generates a response message at step 710, which can be, for example, an acknowledgment or a response to an outbound message which includes a response command, as described above. Alternatively, the selective call transceiver generates, at step 715, an unsolicited message. When the response timer 536 (FIG. 5) has timed out at step 720, an embedded address of the selective call transceiver 106 is included by the response element 520 (FIG. 5), at step 725, in the inbound message which has been generated at step 710 or 715, respectively. When the response timer 536 (FIG. 5) has not timed out at step 720, on the other hand, the inbound address of the selective call transceiver 106 is included by the response element 520 (FIG. 5), at step 730, in the inbound message which has been generated at step 710 or 715, respectively. The selective call transceiver 106 then transmits the inbound message at step 740. It will be appreciated that the selective call transceiver 106 can alternatively use the inbound address at step 730 and transmit a response message at step 740 without determining the state of the response timer 536 (FIG. 5) at step 720, when the predetermined response time is significantly larger than the expected latency of the response message (latency is the delay from the time the response message is transmitted to the time the response message is successfully received and recovered at the system controller 102.) Whether the latency condition is met can be dependent on whether manual intervention is involved before the response message is transmitted.

At step 750, the system controller 102 receives the inbound message from the transmitter/receiver 103. The response identifier 215 (FIG. 2) determines the position of the outbound selective call address from the inbound address in the inbound message at step 760. The selective call transceiver element 252 (FIG. 2) of the response identifier 215 then identifies the inbound message as being associated with the outbound selective call address and associated selective call transceiver 106 by determining which selective call address in the subscriber data base 220 (FIG. 2) is linked to the position corresponding to the inbound address in the inbound message at step 765. When the inbound message is determined to be a response message at step 770, the outbound message element 251 (FIG. 2) of the response identifier 215 then further identifies the inbound message as being associated with the outbound message at step 780 by determining which outbound message in the outbound message memory 208 (FIG. 2) is linked to the position corresponding to the inbound address in the inbound message. The outbound message is then considered delivered and can be removed from the outbound message memory 208 (FIG. 2), and the response message is further processed by the message handler 204 (FIG. 2) at step 790. When the inbound message is determined to be an unsolicited message at step 770, the unsolicited message is further processed by the message handler 204 (FIG. 2) at step 790.

A method for use in a radio communication system having a synchronous outbound signaling protocol, in accordance with the first alternative embodiment of the present invention is described by FIG. 6 and FIG. 7, with the following modifications. The ERMES protocol is used for the outbound signaling protocol. The transmission cycle is a batch. The predetermined response period is a sequence (one hour). The scheduler 216 (FIG. 2) schedules a transmission cycle including an initial address and an outbound message having either a local address or RIC address at the beginning of the outbound message at step 610, the choice of local address or RIC address being dependent on whether the selective call transceiver 106 is assigned to the radio communication system 100. The position of the initial address in the ERMES protocol is assigned by the selective call address element 261 (FIG. 2) and the position of the outbound message is assigned by the outbound message element 263 (FIG. 2). The positions are identified as protocol divisions. The scheduled position of the initial address is stored by the scheduler 216 (FIG. 2) in memory in the system controller 102, linked with the outbound message stored in the outbound message memory 208 (FIG. 2) and the selective call address stored in the subscriber data base 220 (FIG. 2), at step 620. The position of the initial address is identified by the selective call address element 261 (FIG. 2) and stored by the scheduler 216 (FIG. 2) as a word number, a batch letter, a subsequence number, and a cycle number, for example, the position of the initial address is word 76, batch C, subsequence 3, cycle 45. At step 630 (FIG. 2), the system controller 102 couples the outbound message and the initial address to the transmitter/receiver 103 for transmission within the transmission cycle.

The radio signal is received, at step 640, by a selective call transceiver 106, wherein the initial address and outbound message are recovered by error correcting and detecting decoding. When the selective call transceiver 106 determines, at step 650, that the transmission cycle does not include an initial address which matches a predetermined portion of an embedded address which is a RIC address stored within the selective call transceiver 106, the selective call transceiver 106 stops processing the transmission cycle at step 655. When the selective call transceiver 106 determines, at step 650, that the outbound initial address included in the transmission cycle does match a predetermined portion of the embedded RIC address and other matching criteria are met, the selective call transceiver 106 identifies the position of the initial address, generates and stores a new inbound address, processes the outbound message, and resets a response timer 536 (FIG. 5) in the controller 535 (FIG. 5) of the selective call transceiver 106 at step 660. The position of the selective call address is identified using protocol divisions. The inbound address is preferably 21 bits, defined as described above with respect to FIG. 5.

In accordance with a second alternate embodiment of the present invention, the position stored by the division identifier element 265 (FIG. 2) of the system controller 102, identified by the division identifier element 538 (FIG. 5) of the selective call transceiver 106, and identified by the response identifier 215 (FIG. 2) of the system controller 102 in the inbound address is the position of the vector identified by the vector element 262 (FIG. 2) of the system controller 102 and the vector element 532 (FIG. 5) of the selective call transceiver 106. Alternatively, when the outbound message is uniquely intended for the selective call transceiver 106, the position stored by the division identifier element 265 (FIG. 2) of the system controller 102, identified by the division identifier element 538 (FIG. 5) of the selective call transceiver 106, and identified by the response identifier 215 (FIG. 2) of the system controller 102 in the inbound address can be the outbound message identified by the outbound message element 263 (FIG. 2) of the system controller 102 and the outbound message element 533 (FIG. 5) of the selective call transceiver 106. (When, for instance, the outbound message is intended for a group of selective call transceivers 106 and is pointed to by a plurality of vectors, the inbound address would not be unique if the position of the outbound message were used as the inbound address.)

In accordance with a third alternate embodiment of the present invention, the position of the selective call address is stored by a sequence identifier element 264 (FIG. 2) of the system controller 102 and the sequence identifier element 537 (FIG. 5) of the selective call transceiver 106 using the cycle number, the frame number, and a sequential position number of the outbound selective call address among all other selective call addresses included in a FLEX™ frame. Because there are specified to be no more than 44 short address words in a frame when the data rate is 1600 bps, 6 bits can be used to identify the sequential position number of an address within all the addresses in a frame. (When the data rate is 6400 bps, 8 bits are required). Thus, the inbound address can be as small as 17 bits (6 bits sequential position plus 7 bits for a frame number and 4 bits for a cycle number).

It will be appreciated that the exact length of the inbound address can be one bit more or less than that described in the preferred and alternative embodiments, depending on certain design considerations. For example, when the maximum of one hundred forty addresses is restricted to 127 addresses in the ERMES system, one less bit is required. This may be desired in some systems. Or, for example, it can be difficult to distinguish the inbound addresses from the embedded addresses in some systems. This can be resolved by adding one bit.

It will be appreciated that for selective call transceivers which are active in a radio communication system having a synchronous outbound signaling protocol, selective call addresses or other elements of the protocol can typically be uniquely identified with an outbound message and/or a selective call transceiver 106 by a position in the protocol. The position can be rendered into an inbound message identifier which can be used to great advantage in other unsolicited and response messages for a predetermined response period, in accordance with the preferred and alternate embodiments of the present invention. The improvement of throughput gained by the use of the shortened inbound address is greater when the selective call transceiver 106 generates asynchronous inbound messages (i.e., ALOHA and slotted ALOHA messages), because the ratio of the inbound messages which use the shortened address to an initial inbound message having the long address is higher. (The initial inbound message is a message having the long address which must be transmitted after the selective call transceiver 106 has been inactive longer than the predetermined response period.) It will be further appreciated that in systems wherein selective call transceivers are highly active, but for short periods of time, a shorter predetermined response period can be defined, such as twelve minutes for the third alternate embodiment of the present invention. This shortens the inbound address by three bits.

It will also be appreciated that for radio communication systems using an asymmetrical protocol, such as an acknowledge back paging system, wherein the average length of the inbound messages is typically shorter than in symmetrical systems, the improvement of throughput is greater. For example, in a radio communication system using the FLEX™ protocol as an outbound synchronous protocol, the information in the inbound address can be shortened from 42 bits in two 32 bit words to 19 bits in one 32 bit word. When asynchronous inbound messages include a high percentage of one information word responses, the average inbound message length could be reduced from approximately 3.5 words to 2.5 words. A similar savings can be achieved for a radio communication system using the ERMES protocol for outbound messages.

By now it should be appreciated that there has been provided an apparatus and method for identifying inbound messages in a radio communication system which can significantly reduce the average length of asynchronous inbound messages, thereby improving information throughput of the inbound messages in the radio communication system.

We claim:

1. A method for use in a radio communication system having a synchronous outbound signaling protocol, the method comprising, within a system controller, the steps of:
scheduling an outbound selective call address and an outbound message, wherein each is scheduled at a position within a transmission cycle of the synchronous outbound signaling protocol which is uniquely identifiable;
storing the outbound selective call address and the outbound message, and storing the position of a predetermined one of the outbound selective call address and the outbound message; and
transmitting the outbound selective call address and the outbound message within the transmission cycle, wherein the method further comprises, within a selective call transceiver having at least one embedded selective call address, the steps of:
receiving the transmission cycle;
generating within the selective call transceiver an inbound address when the outbound selective call address matches a predetermined portion of one of the at least one embedded selective call address, the inbound address being determined from the position within the transmission cycle of the predetermined one of the outbound selective call address and the outbound message;
including the inbound address in an inbound message when the inbound message is transmitted within a predetermined response period after the outbound message is received; and
transmitting the inbound message, and wherein the method further comprises, within the system controller, the steps of:
receiving the inbound message; and
identifying the inbound message based on the inbound address included in the inbound message and the position within the transmission cycle which is stored in said step of storing.

2. The method according to claim 1, wherein the position is linked with the outbound message in said step of storing, and wherein said step of identifying the inbound message comprises the steps of:
determining the position from the inbound address; and
identifying the inbound message as being associated with the outbound message by the linking of the position to the outbound message stored in the system controller.

3. The method according to claim 1, wherein the position is linked with the outbound selective call address in said step of storing, and wherein said step of identifying the inbound message comprises the steps of:
determining the position from the inbound address; and
identifying the inbound message as being associated with the selective call transceiver by the linking of the position to the outbound selective call address stored in the system controller.

4. The method according to claim 1, wherein a vector is scheduled within the transmission cycle of the synchronous outbound signaling protocol, and wherein, in said step of storing a position of the vector is stored, and wherein the inbound address is determined from the position of the vector in said step of generating.

5. The method according to claim 1, wherein the position is identified by a position identity of at least one of a group of protocol divisions of the synchronous outbound signaling protocol in said steps of storing and generating.

6. The method according to claim 5, wherein the group of protocol divisions comprises of a cycle, a frame, a block, and a word of a FLEX™ protocol.

7. The method according to claim 5, wherein the group of protocol divisions comprises of a cycle, a subsequence, a batch, and a word of an ERMES protocol.

8. The method according to claim 1, wherein the predetermined one of the outbound selective call address and the outbound message is the outbound selective call address in said step of storing, and wherein the position is identified by a sequential position of the outbound selective call address among all other outbound selective call addresses included in the transmission cycle in said steps of storing and generating.

9. A radio communication system comprising:
a system controller for generating a synchronous outbound signaling protocol, the system controller comprising:
a scheduler for scheduling an outbound selective call address and an outbound message included within a transmission cycle of the synchronous outbound signaling protocol, wherein the outbound selective call address is scheduled at a position within the transmission cycle, the position identified by unique identities of protocol divisions of the synchronous outbound signaling protocol;
a memory, coupled to the scheduler, for storing the position and the outbound selective call address, and for linking the position with the outbound selective call address; and
a cell site controller, coupled to said scheduler, for controlling a transmitter which transmits the transmission cycle; and
a selective call transceiver having at least one embedded selective call address stored therein, comprising:
a receiver for receiving the transmission cycle;
a controller, coupled to said receiver, for recovering the outbound message included in the transmission cycle, for generating a response signal when the outbound selective call address matches a predetermined portion of one of the at least one embedded selective call address, and for identifying the position within the transmission cycle at which a predetermined one of the outbound message and outbound selective call address is located;
an alert device, coupled to said controller, for generating a sensible alert in response to the response signal;
a response element, coupled to the controller, for generating a inbound address in response to the response signal, wherein the inbound address is determined from the position of one of the outbound message and the outbound selective call address within the transmission cycle, and for including the inbound address in an inbound message when the inbound message is transmitted within a predetermined response period after the outbound message is received; and a transmitter, coupled to said response element, for transmitting the inbound message, and wherein the system controller further comprises a response identifier, coupled to said memory and said cell site controller, said cell site controller for receiving the inbound message, and said response identifier for determining the position within the transmission cycle from the inbound address and identifying the inbound message as being associated with the selective call transceiver by the linking of the position within the synchronous outbound signaling protocol to the outbound selective call address.

10. A system controller used in a radio communication system for generating a synchronous outbound signaling protocol, the system controller comprising:

a scheduler for scheduling an outbound selective call address and an outbound message included within a transmission cycle of the synchronous outbound signaling protocol;

a memory, coupled to the scheduler, for storing a position of a predetermined one of the outbound selective call address and the outbound message;

a cell site controller, coupled to said scheduler and to a fixed transmitter and receiver, for controlling the fixed transmitter which transmits the transmission cycle and for receiving an inbound message transmitted by a selective call transceiver; and a response identifier, coupled to said memory and said cell site controller, for determining the position from a inbound address included in the inbound message and identifying the inbound message based on the inbound address included in the inbound message and the position stored in said memory.

11. The system controller according to claim 10, wherein the outbound message is stored in said memory and the position is linked with the outbound message, and wherein said response identifier further comprises an outbound message element which identifies the inbound message as being associated with the outbound message by the linking of the position to the outbound message.

12. The system controller according to claim 10, wherein the outbound selective call address is stored in said memory and the position is linked with the outbound selective call address, and wherein said response identifier further comprises a selective call transceiver element which identifies the inbound message as being associated with the selective call transceiver by the linking of the position to the outbound selective call address.

13. The system controller according to claim 10, wherein said scheduler further comprises a vector element which schedules a vector within the transmission cycle of the synchronous outbound signaling protocol, and wherein a position of the vector is stored in said memory.

14. The system controller according to claim 10, wherein said scheduler comprises a division identifier element which identifies the position by a position identity of at least one of a group of protocol divisions.

15. The system controller according to claim 14, wherein the group of protocol divisions consists of a cycle, a frame, a block, and a word of a FLEX™ protocol and the position identity of each of the at least one of a group of protocol divisions is a number.

16. The system controller according to claim 14, wherein the group of protocol divisions consists of a cycle, a subsequence, a batch, and a word of an ERMES protocol and the position identity of each of the at least one of a group of protocol divisions is one of a number and a letter.

17. The system controller according to claim 10, wherein the position of the predetermined one of the outbound selective call address and the outbound message stored in said memory is the position of the outbound selective call address, and wherein said scheduler comprises a sequence identifier element which identifies the position by a sequential position of the outbound selective call address among all other outbound selective call addresses included in the transmission cycle.

18. A selective call transceiver for use in a radio communication system having a synchronous outbound signaling protocol, the selective call transceiver comprising:

a receiver for receiving an outbound selective call address and an outbound message included within a transmission cycle of the synchronous outbound signaling protocol;

a memory for storing at least one embedded selective call address;

a controller, coupled to said receiver and said memory, for recovering the outbound selective call address and outbound message, for generating a response signal when the outbound selective call address matches a predetermined portion of one of the at least one embedded selective call address, and for identifying a position of a predetermined one of the outbound selective call address and the outbound message within the transmission cycle;

an alert device, coupled to said controller, for generating a sensible alert in response to the response signal;

a response element, coupled to the controller, for generating a inbound address in response to the response signal, wherein the inbound address is determined from the position, and for including the inbound address in an inbound message when the inbound message is transmitted within a predetermined response period after the outbound message is received; and a transmitter, coupled to said response element, for transmitting the inbound message.

19. The selective call transceiver according to claim 18, wherein a vector is included within the transmission cycle of the synchronous outbound signaling protocol, and wherein the controller comprises a vector element which identifies a position of the vector, and wherein the inbound address is determined by the position of the vector.

20. The selective call transceiver according to claim 18, wherein said controller comprises a division identifier which identifies the position by a position identity of at least one of a group of protocol divisions of the synchronous outbound signaling protocol.

21. The selective call transceiver according to claim 20, wherein the group of protocol divisions consists of a cycle, a frame, a block, and a word of a FLEX™ protocol and the position identity of each of the at least one of a group of protocol divisions is a number.

22. The selective call transceiver according to claim 20, wherein the group of protocol divisions consists of a cycle, a subsequence, a batch, and a word of an ERMES protocol and the position identity of each of the at least one of a group of protocol divisions is one of a number and a letter.

23. The selective call transceiver according to claim 18, wherein said controller comprises a sequence identifier which identifies the position by a sequential position of the outbound selective call address among all other outbound selective call addresses included in the transmission cycle.

* * * * *